(12) United States Patent
O'Brien et al.

(10) Patent No.: US 6,250,164 B1
(45) Date of Patent: Jun. 26, 2001

(54) MEASUREMENT OF FLUID PRESSURE WITHIN A TUBE

(75) Inventors: Richard J. O'Brien, Prior Lake, MN (US); Richard A. Sorich, Encinitas, CA (US); Alan Wirbisky, Ed, MN (US)

(73) Assignee: Medtronic, Inc., Minneapolis, MN (US)

( * ) Notice: Subject to any disclaimer, the term of this patent is extended or adjusted under 35 U.S.C. 154(b) by 0 days.

(21) Appl. No.: 08/798,077

(22) Filed: Feb. 12, 1997

(51) Int. Cl.$^7$ ........................................... G01L 7/02
(52) U.S. Cl. .............................. 73/730; 604/153
(58) Field of Search ................. 73/730; 604/153

(56) References Cited

U.S. PATENT DOCUMENTS

| | | | |
|---|---|---|---|
| 4,483,196 | * 11/1984 | Kurtz et al. | 73/730 |
| 4,758,228 | 7/1988 | Williams | 604/153 |
| 4,825,876 | 5/1989 | Beard | 128/675 |
| 5,044,203 | * 9/1991 | Wiest et al. | 73/730 |
| 5,335,551 | 8/1994 | Ohnishi et al. | 73/731 |

FOREIGN PATENT DOCUMENTS

| | | | |
|---|---|---|---|
| 25 33 078 A1 | 2/1977 | (DE) | G01L/19/00 |
| 38 38 689 C1 | 6/1990 | (DE) | A61M/5/168 |
| 0 471 492 A2 | 2/1992 | (EP) | G01L/9/00 |
| WO 97/34523 | 9/1997 | (WO) | A61B/5/0215 |

\* cited by examiner

Primary Examiner—Joseph L. Felber
(74) Attorney, Agent, or Firm—Harold R. Patton

(57) ABSTRACT

A method of sensing fluid pressure in which a deformable tube provides an accessible and substantially flat section. Deflection of the flat section reflects line pressure. In one embodiment, a fluid pressure sensing apparatus comprises a deformable tube for carrying fluid and at least one constraint member comprising an inner surface and a pressure sensing opening. The inner surface comprises a substantially flat portion and a constraint portion. The tube is positioned against the inner surface and constrained by the constraint portion such that a portion of the tube is deformed against the substantially flat portion of the inner surface. This produces a substantially flat section of the tube adjacent to, and accessible through, the pressure sensing opening. Similarly, a method of manufacturing a fluid pressure sensing apparatus comprises the steps of: providing a deformable tube, and constraining the tube to provide an accessible and substantially flat section of the tube. The method and apparatus are suitable for cardioplegia safety systems and other systems involving a shear sensitive fluid such as blood.

6 Claims, 13 Drawing Sheets

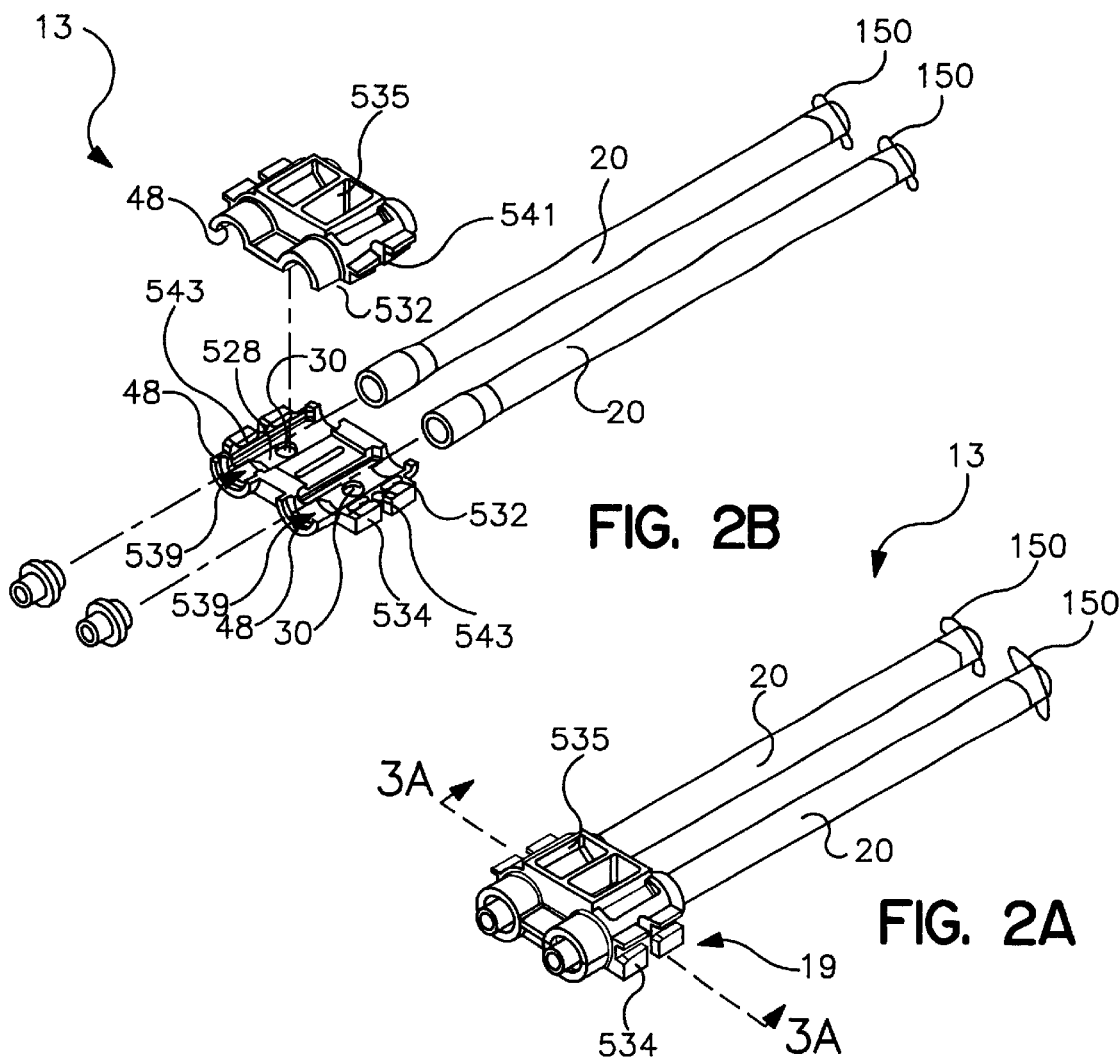

```
┌─────────────────────────────────────────────┐
│ POSITION A FIRST CONSTRAINT MEMBER          │
│ ON AN ASSEMBLER TOOL BODY                   │
│ HAVING A FILLER ELEMENT INSERTED            │
│ IN EACH PRESSURE READING OPENING            │
└─────────────────────────────────────────────┘
                      │
┌─────────────────────────────────────────────┐
│ PLACE BONDING MATERIAL ON AN                │
│ INSIDE SURFACE OF THE FIRST CONSTRAINT      │
│ MEMBER AND THE SECOND CONSTRAINT MEMBER     │
└─────────────────────────────────────────────┘
                      │
┌─────────────────────────────────────────────┐
│        STRETCH A TUBE ACROSS THE            │
│          FIRST CONSTRAINT MEMBER            │
└─────────────────────────────────────────────┘
                      │
┌─────────────────────────────────────────────┐
│         ENGAGE ENDS OF THE TUBE             │
│          IN ENGAGEMENT MECHANISMS           │
└─────────────────────────────────────────────┘
                      │
┌─────────────────────────────────────────────┐
│ LOOSELY POSITION THE SECOND CONSTRAINT      │
│ MEMBER OVER THE TUBE AND FIRST CONSTRAINT   │
│                   MEMBER                    │
└─────────────────────────────────────────────┘
                      │
┌─────────────────────────────────────────────┐
│              PRESSURIZE THE TUBE            │
└─────────────────────────────────────────────┘
                      │
┌─────────────────────────────────────────────┐
│ LOCK THE FIRST AND SECOND CONSTRAINT        │
│ COMPONENTS TOGETHER USING A POSITIONING     │
│                  ELEMENT                    │
└─────────────────────────────────────────────┘
                      │
┌─────────────────────────────────────────────┐
│ DETACH THE FIRST CONSTRAINT COMPONENT       │
│ FROM THE ASSEMBLER TOOL BODY                │
└─────────────────────────────────────────────┘
```

FIG. 5

MEASUREMENT OF FLUID PRESSURE WITHIN A TUBE

FIELD OF THE INVENTION

This invention relates to sensing fluid pressure.

BACKGROUND

Pressure measurements of fluid flowing within a tube can be made in a variety of ways. For example, a strain gage, may be placed on the outside of the tube. However, as internal pressure of a tube changes, the tube "balloons," i.e., the tube wall stretches, varying the tube wall thickness, in the area where the strain gage is located. Forces due to the internal pressure of the tube, and forces due to variations in thickness along the tube wall, hinder accurate measurement of the internal pressure alone.

Another method uses a "T" fitting to divert a portion of the fluid to a pressure transducer. This method adds cost, complexity, and increases the probability of leakage, and may produce trauma to the fluid (if the fluid is blood, trauma can result in hemolysis).

SUMMARY OF THE INVENTION

The invention is a method of sensing fluid pressure in which a deformable tube provides an accessible and substantially flat section. Deflection of the flat section reflects line pressure. In one embodiment, the invention is a fluid pressure sensing apparatus, comprising a deformable tube for carrying fluid and at least one constraint member comprising an inner surface and a pressure sensing opening. The inner surface comprises a substantially flat portion and a constraint portion. The tube is positioned against the inner surface and constrained by the constraint portion such that a portion of the tube is deformed against the substantially flat portion of the inner surface. This produces a substantially flat section of the tube adjacent to, and accessible through, the pressure sensing opening. Similarly, in another embodiment, a method of manufacturing a fluid pressure sensing apparatus comprises the steps of: providing a deformable tube, and constraining the tube to provide an accessible and substantially flat section of the tube.

BRIEF DESCRIPTION OF THE DRAWING

FIG. 2A is a perspective view of one embodiment of the invention.

FIG. 2B is an exploded view of the embodiment of FIG. 2A.

FIG. 5 is a flow diagram illustrating a method of assembly for a tube constraint apparatus.

DETAILED DESCRIPTION

Figure 1A:
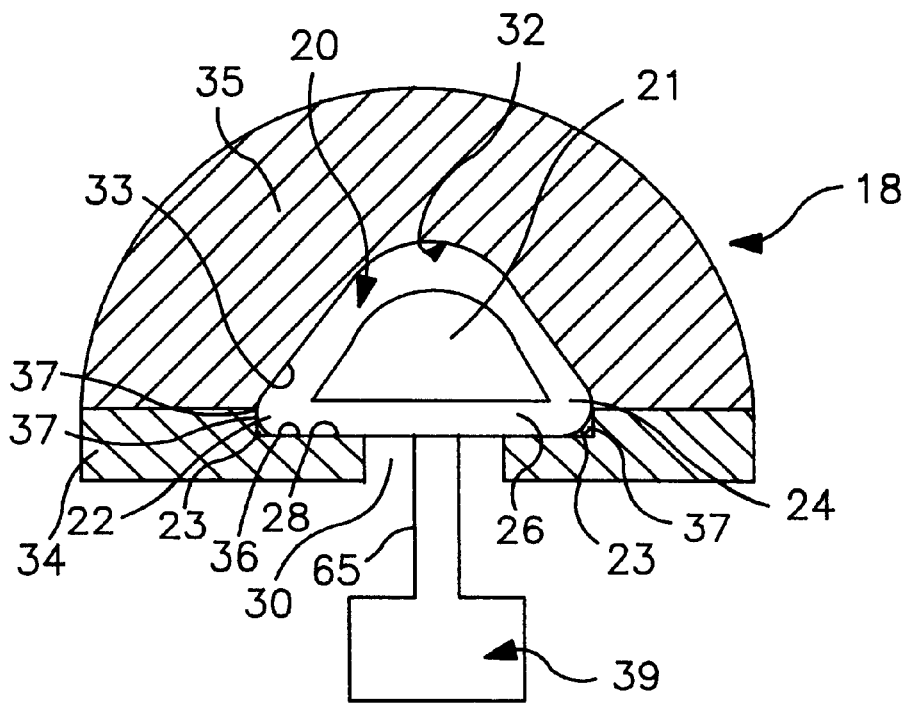
FIGS. 1A to 1E are cross-sectional views of embodiments of the invention.

As shown in FIG. 1A, a tube 20 is constrained as to facilitate ease and accuracy of fluid pressure measurements. Fluid pressure in the tube 20 is measured by constraining the tube 20 such that fluid pressure measurements are taken at an accessible, substantially flat section 26 of the tube 20. Reliable fluid pressure measurements can easily be taken through a pressure sensing opening 30 defined in a constraint member 18. The substantially flat shape of the tube 20 at the pressure sensing opening 30 minimizes the influence of tube variables, such as the tube wall thickness, which can prevent accurate fluid pressure measurement. In effect, the substantially flat section 26 of the tube 20 acts like a pressure diaphragm, measuring only linear deflection of the tube wall in response to fluid pressure on the tube wall.

Fluid flow in the tube 20 should not be substantially impeded. For example, impeding fluid flow may create a pressure drop in the area of constraint, undesirably altering the pressure measurements. Furthermore, it is undesirable to impede fluid flow through the tube 20 such that damaging shear forces act on the fluid. When shear-sensitive fluids, such as blood, flow through the tube 20, damaging shear forces can break down various components of the fluid. For example, excessive shear force can cause hemolysis of blood.

Accurate fluid pressure readings within a fluid flow system are important. Fluid pressure readings can be used to control the fluid flow.

FIG. 1A, shows one embodiment of the constraint member 18. Tube 20 is constrained in a tube opening 21 such that stresses from spring forces and other variations in the tube wall thickness are localized at two areas 22 and 24 on either side of the substantially flat section 26 of the tube 20. A change in curvature of the tube 20 creates localized stress at the areas of curvature 22 and 24, substantially fixing these areas 22 and 24 in the tube opening 21 defined by the constraint member 18 and forming the substantially flat section 26.

The constraint member 18 has an inner surface 32 that defines the tube opening 21. The inner surface 32 includes a substantially flat portion 28 and a pressure sensing opening 30. The inner surface 32 also includes a constraint portion 33 for use in constraining the tube 20 in the tube opening 21

The tube 20 is constrained in the tube opening 21 such that a substantially flat section 26 of the tube 20 is formed adjacent the substantially flat portion 28 of the inner surface 32. The tube 20 is further constrained in the tube opening 21 such that a first constrained section 22 of the tube 20 adjacent or along a first side of the substantially flat section 26 of the tube 20 is substantially fixed within the tube opening 21. A second constrained section 24 of the tube 20 adjacent or along a second side of the substantially flat section 26 of the tube 20 is also substantially fixed within the tube opening 21.

The first and second constrained sections 22 and 24, respectively, of the tube 20 correspond to the areas of localized stress at areas of curvature described previously. The constrained sections 22 and 24 maintain the substantially flat section 26 of the tube 20. A void 23 may be created between each constrained section 22 and 24 of the tube 20 and the inner surface 32. The voids 23 are located at about the intersection of the substantially flat portion 28 and the constraint portion 33 of the inner surface 32. Such voids 23 accommodate tolerances in defining the tube opening 21 by the constraint member 18, and are created when the tube 20 is constrained in the tube opening 21. For example, as shown in FIG. 1A, the voids 23 are created such that the substantially flat section 26 is not forced into the sensing opening 30 or away from the substantially flat portion 28 of the inner surface 32. The voids 23 help accommodate typical tolerances in the dimensions and properties of the tube 20, but they are not essential to the invention.

The change in curvature of the tube 20 substantially fixes the constrained sections 22 and 24 within the tube opening 21. Substantially fixing the tube 20 by localizing the stresses at constrained sections 22 and 24 provides the flat diaphragm-like section 26 accessible at the pressure sensing opening 30. The tube 20 is substantially fixed when it remains stationary despite substantial variations in the fluid system pressure, and does not resume its pre-constrained configuration. In particular, the tubing must have an elasticity which is essentially constant over the anticipated temperature range of the fluid within the tubing. In preferred embodiments of the invention, the tubing is made of a silicone-based material suitable for medical grade transport of blood and/or cardioplegia applications, for which the relevant temperature range is about 2–40 degrees Celsius. The preferred tubing for such applications is standard medical grade tubing manufactured by conventional techniques from the general purpose elastomers available under the tradename SILPLUS models SE6035 and SE6075 from the General Electric Corporation (http://www.ge.com). The materials are blended together by conventional techniques to achieve durometer of 55 to 65 Shore A, most preferably 55 Shore A. In other applications of the invention, the tubing material would be chosen to fit the particular circumstances present.

In any embodiment of the invention, the constraint member 18 can be a single integral component or comprise any number of component parts. In the example of FIG. 1A, the constraint member 18 includes a first constraint component 34 and a second constraint component 35. This embodiment provides ease of assembly when the assembler tool and method of assembly described below. Similarly, in any embodiment of the invention any component can itself be formed of more than one component or it can be one integral component.

When the constraint member 18 includes more than one component, as illustrated in FIG. 1A, the first constraint component 34 may include the substantially flat portion 28 of the inner surface 32, and pressure sensing opening 30.

The first constraint component 34 includes a channel having a bottom wall 36 and two side walls 37. The channel aids the assembly of the constraint member 18 by providing a guide for positioning and formation of the substantially flat section 26 of the tube 20. The first constraint component 34 substantially fixes the first and second constrained sections 22 and 24 of the tube 20 at intersections of the bottom wall 36 and the two side walls 37 within the channel.

The second constraint component 35 is shaped suitable to engage the first constraint component 34, and thus modify the shape of the tube 20 in the tube opening 21. The shape of the tube 20 is modified to substantially fix the first and second constrained sections 22 and 24 as described above.

The constraint member 18, whether it is one integral component or more than one component, defines the tube opening 21 to comprise at least two bends of about 90 degrees or less, thus substantially fixing sections 22 and 24 of the tube 20 adjacent respective sides of the substantially flat section 26 within the tube opening 21. A first bend is located along one side of the substantially flat section 26 of the tube 20 and adjacent the first constrained portion 22. A second bend is located along an opposing side of the substantially flat section 26 of the tube 20 and adjacent the second constrained portion 24. In this embodiment, the tube 20 (apart from the substantially flat section 26) is a semi-circular, or semi-elliptical, shape within the tube opening 21.

Figure 1B:
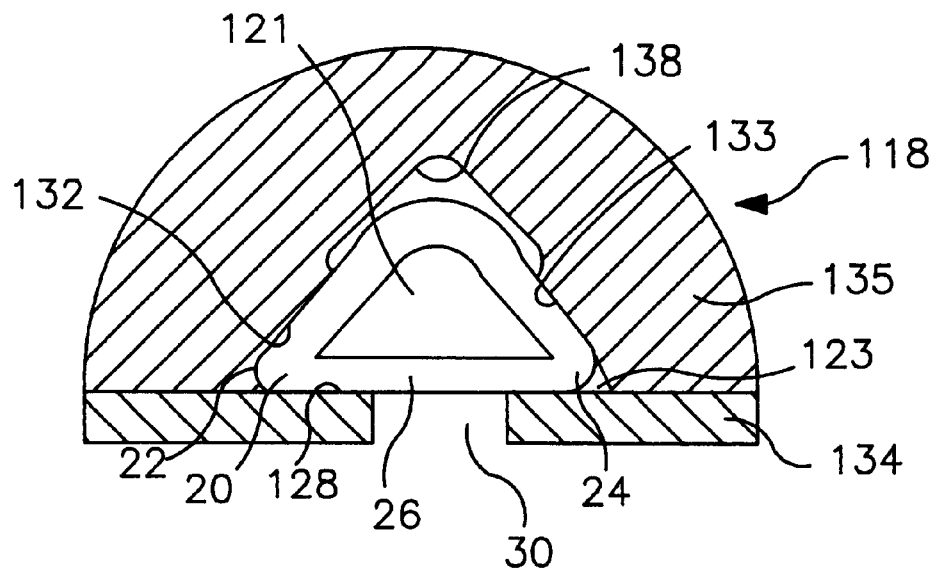
Figure 1C:
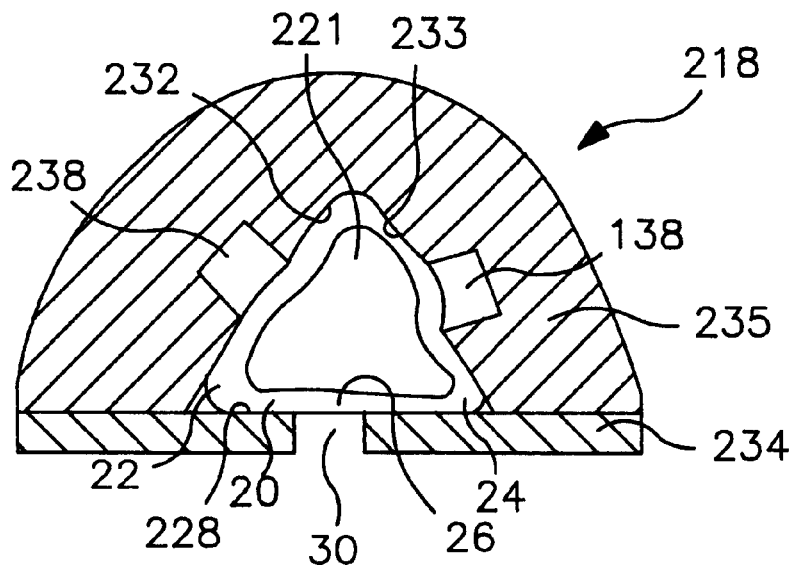

However, the shape of the tube opening 21 can include one or more additional bends as shown in the illustrative embodiments of FIGS. 1B–1E. For example, as illustrated in FIGS. 1B and 1C, when the inner surface 132, 232 of the constraint member 118, 218, respectively, has three bends, the tube 20 is constrained in a substantially triangular shape within a similarly shaped tube opening 121, 221. The substantially flat portion 128, 228 of the constraint member 118, 218 lies between two of the bends.

The preferred bend angle is approximately 90 degrees, as this has been found to provide an optimum amount of capture of the tube in the apparatus in the axial direction, i.e., the tube does not slip out of the apparatus along its length in either direction.

As further illustrated in FIG. 1B, an optional escape portion 138 enables a void to be created between the tube 20 and the constraint member 118 is defined in the second constraint component 135 of the constraint member 118 (which includes first and second constraint components 134 and 135). Escape portion 138 is defined in the second constraint component 135 of the constraint member 118 (which includes first and second constraint components 134 and 135.) Even with escape portion 138 defined in the second constraint component 135 of the constraint member 118, constrained sections 22 and 24 of the tube 20 remain substantially fixed on opposite sides of the substantially flat section 26 of the tube 20. The escape portion 138 and associated void are located adjacent a region of the tube 20 outside of the substantially flat section 26. For example, when the tube opening 121 is substantially triangular-shaped, an escape portion 138 can be defined at a bend opposite the substantially flat portion 128 of the inner surface 32, i.e., at an apex of the triangular tube opening opposite the flat portion 128. The escape portion 138 defines a void between the tube 20 and the constraint member 18.

In the embodiment of FIG. 1B, the escape portion 138 defined in the inner surface 132 is symmetrically located with symmetry relative to the substantially flat section 26 of the tube 20. The escape portion 138 is located about equidistant from each end of the substantially flat portion 128 of the inner surface 132, i.e. symmetrically at the apex opposite the substantially flat section 26.

In the embodiment of FIG. 1C, two escape portions 238 (creating voids between the tube 20 and the constraint member 218) are defined in the second constraint component 235 of the constraint member 218. Constraint member 218 includes first and second constraint components 234 and 235. The voids are symmetrically located relative to the of the substantially flat portion 228 of the inner surface 232. The escape portions 238 are located about equidistant from each end of the substantially flat portion 228 of the inner surface 232, i.e., at the same position adjacent respective legs of the triangular shaped tube.

Thus, in both embodiments the escape portion 138 or multiple escape portions 238 are symmetrically located in the constraint components 135 and 235 with respect to of the substantially flat portion 128, 228 of the inner surface 132, 232 of the respective constraint members 118, 218. This relationship is generally true; that any number of escape portions may be utilized and that any position of such escape portions, including symmetric positioning with relative to the substantially flat portion of the constraint member, is possible.

Constraint of the tubes illustrated in FIGS. 1B and 1C is performed without the use of a channel within the first constraint component 134, 234 of the respective constraint member 118, 218. Constraint section 22, 24 of the tube 20 are formed substantially at the intersection of the first and second constraint components of the constraint members 118 and 218.

As described previously with reference to FIG. 1A, the tube 20 is constrained in a substantially semi-circular or semi-elliptical shape. As described previously with reference to FIGS. 1B and 1C, the tube 20 is constrained in a substantially triangular shape. FIG. 1B, the escape portion 138 is located at an apex or bend of the substantially triangular shape between the tube 20 and the constraint member 118. In FIG. 1C, the escape portions 238 are located along legs of the substantially triangular shape between the tube 20 and the constraint member 218. In these embodiments, the pressure sensing opening 30 is located approximately at a center of a base of the substantially triangular shape.

The tube 20 need not be constrained in a Triangular shape or semi-circular or semi-elliptical shape. The tube 20 may take any shape as long as the substantially flat section 26 of the tube 20 is formed by substantially fixing respective sections adjacent or along opposing sides of the substantially flat section 26 within the tube opening, formed by the various constraint members. Such other configurations may also include one or more escape portions in the various configurations of the constraint members defining the tube opening as described above.

Figure 1D:
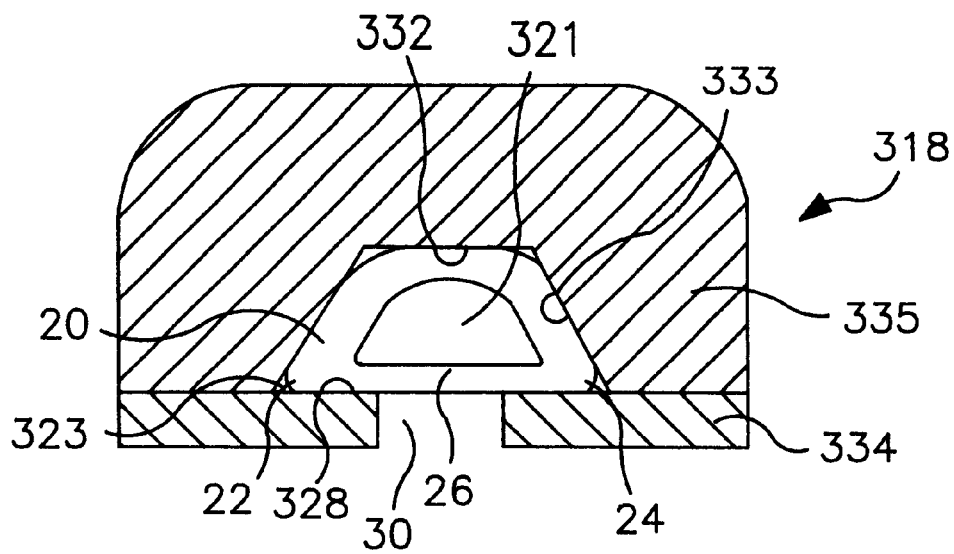

For example, as illustrated in FIG. 1D, the lube 20 can be constrained in a substantially trapezoidal shape. Respective ends of the substantially flat section 26 of the tube 20 are substantially fixed at constrained sections 22 and 24 of the tube 20 at the intersection of the constraint component 335 and constraint component 334. Voids 323 are located between the constrained sections 22 and 24 and the constraint member 318 at such intersections and at the various other bends of the constraint member 318, The voids perform the same functions as described above with respect to the voids 23 and may also function like the escape portions previously described. The tube opening 321 of this configuration is defined by the constraint portion 333 and substantially flat portion 328 form the substantially flat section 26, accessible through opening 30.

Figure 1E:
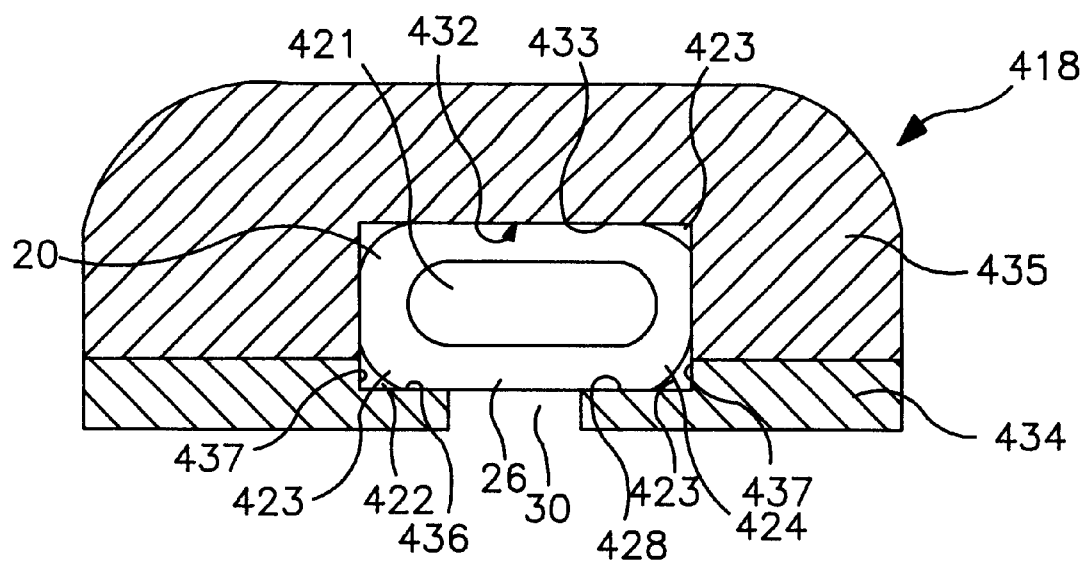

Another example is illustrated in FIG. 1E. In this embodiment, the tube 20 is constrained in a substantially rectangular shape in a similarly shaped tube opening 421 defined by constraint surface 433 and flat surface 428 of inner surface 432. Respective sections adjacent the substantially flat section 26 are substantially fixed at the intersection of the walls 437 and bottom 436 of a channel defined in the first constraint component 434. Voids 423 between the tube and constraint member 418 function similar of FIGS. 1B and 1C. The substantially flat section 26 of the tube 20 is accessible through the pressure sensing opening 30 defined in the first constraint component 434.

Pressure measurements are taken on the substantially flat section 26 of the tube 20 using any suitable pressure sensing mechanism 39, as illustrated in FIG. 1A. For example, a commercially available strain beam, such a model 800 planar beam sensor available from Revere Transducers, Inc. of Cerritos, Calif. (http://reveretransducers.com) can be used. The strain beam is coupled to a pin 65 in contact with the tube 20, as generally illustrated in FIG. 1A and illustrated in one particular embodiment in FIG. 7. The diameter of the pin 65 can be, for example, about 0.060 to about 0.1875 inches. The larger the pin diameter, the larger the force that can be read per pressure reading. By reading a larger force, a more accurate pressure reading can be taken. Thus, the diameter of the pin is at least one element that sets the sensitivity of the pressure measurement.

More than one tube 20 can be constrained, as illustrated in FIGS. 2A–3A; this embodiment is substantially a dual representation of FIG. 1A. Further detail of a dual constraint tube apparatus 13, including a dual tube constraint member 19, FIGS. 2A to 2C. The dual tube constraint member 19 includes a first constraint component 534 and second constraint component 535. The first constraint component 534 includes two pressure sensing openings 30 each having a diameter large enough to allow for measurement of linear deflection of tubes 20. The larger the diameter of the pressure sensing openings 30, the larger the pressure sensing area can be for sensing deflection of the tube 20 (i.e., a larger pin diameter in pressure sensing mechanism 36). As described above, a larger pressure sensing area typically results in less error in the measurement. For example, the diameter of the pressure sensing openings 30 may be about 0.25 inches.

Figure 3A:
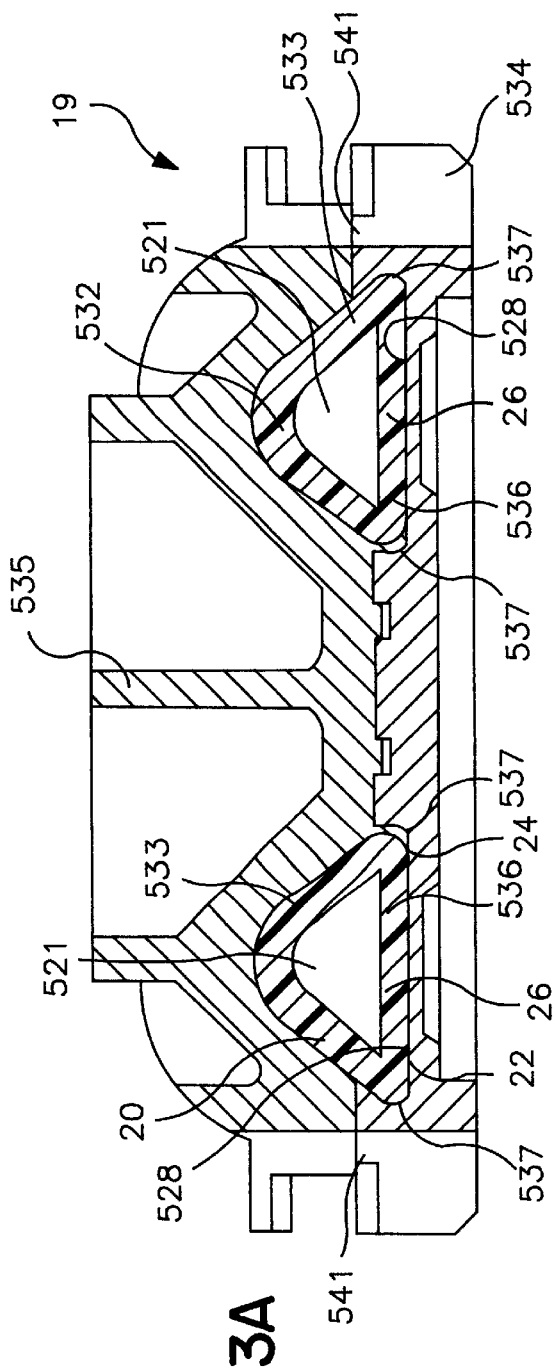
FIG. 3A is a cross-sectional view of the embodiment of FIG. 2A taken line 3A—3A.

As shown in FIG. 3A, the first constraint component 534 includes channels 539. Each channel 539 includes a bottom wall 536 and two side walls 537. The channels 539 aid the assembly process of the constraint member 19 by providing a guide for formation of the substantially flat section 26. The first constraint component 534 substantially fixes the first and second constrained sections 22 and 24 of each tube 20 at intersections of the bottom wall 536 and the two side walls 537 within each channel 539.

The second constraint component 535 is engaged with the first constraint component 534 encasing and constraining the tubes 20. The first and second constraint components 534 and 535 can be manufactured such that they interlock. For example, as illustrated in FIGS. 2B and 3A, posts 541 on the second constraint component 535 fit into channels 543 in the first constraint component 534. Any suitable other locking mechanism may be used.

The bottom walls 536 of the channels 539 of first constraint component 534 are substantially flat. This facilitates forming of the substantially flat sections 26 of the tubes 20. As shown in FIG. 3A the shape of the second constraint component 535 is semi-elliptical or semi-circular. This fixes the constrained sections 22, 24 of the tube 20 which are adjacent the substantially flat section 26. The shape in which the tube is constrained can vary widely, i.e., trapezoidal, rectangular, etc. The second constraint component 535 may include escape portions or voids. The constraint components forming the member 19 can be integral components or multiple components.

FIG. 3A is a cross-sectional view of the dual tube constraint member 19 without escape portions which constrain two tubes 20. For many applications, it is desirable to obtain pressure measurements on more than one tube 20, each pressure measurement having the same sensitivity and extraneous forces present. Thus, all tubes 20 within the multiple tube constraint member 19 should have identical number, shape, and location of escape portions, if utilized. As shown in FIG. 3A, the tubes 20 are constrained in the tube openings 521 such that both tubes include a substantially flat section 26 accessible through a respective sensing openings 30.

Figure 2C:
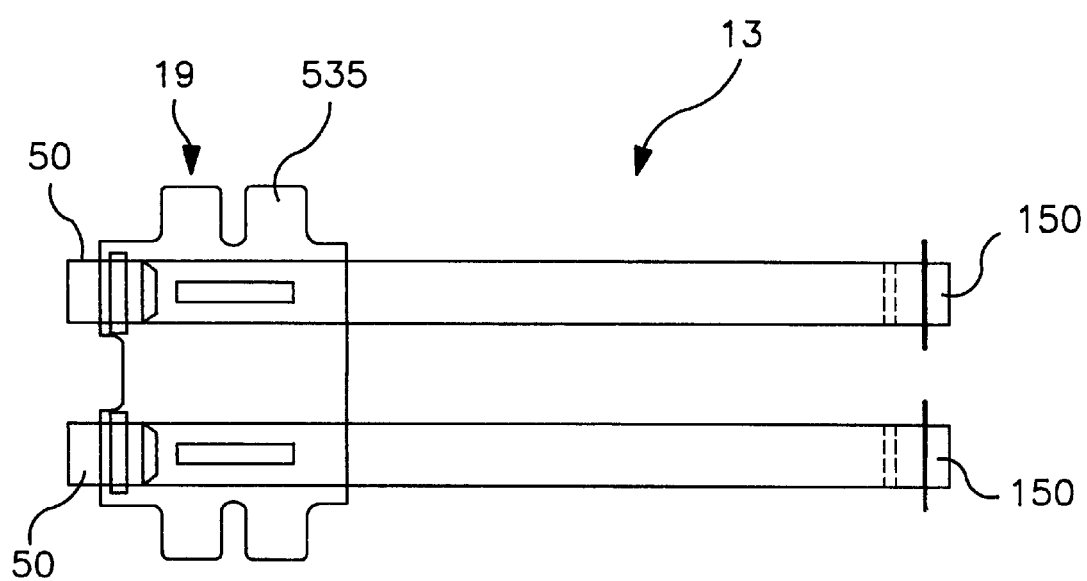
FIG. 2C is a top view of the embodiment of FIG. 2A.

As further shown in FIGS. 2A–2C, the dual constraint tube apparatus 13 may include couplings 50, 150 at each end of the tubes 20. The couplings 50, 150 permit connection of the tubes 20 to other parts of a system in which the apparatus 13 is used. Each of the couplings 50 are sized to fit within a channel 48 defined at one end of the first and second constraint components 534, 535.

Figure 3B:
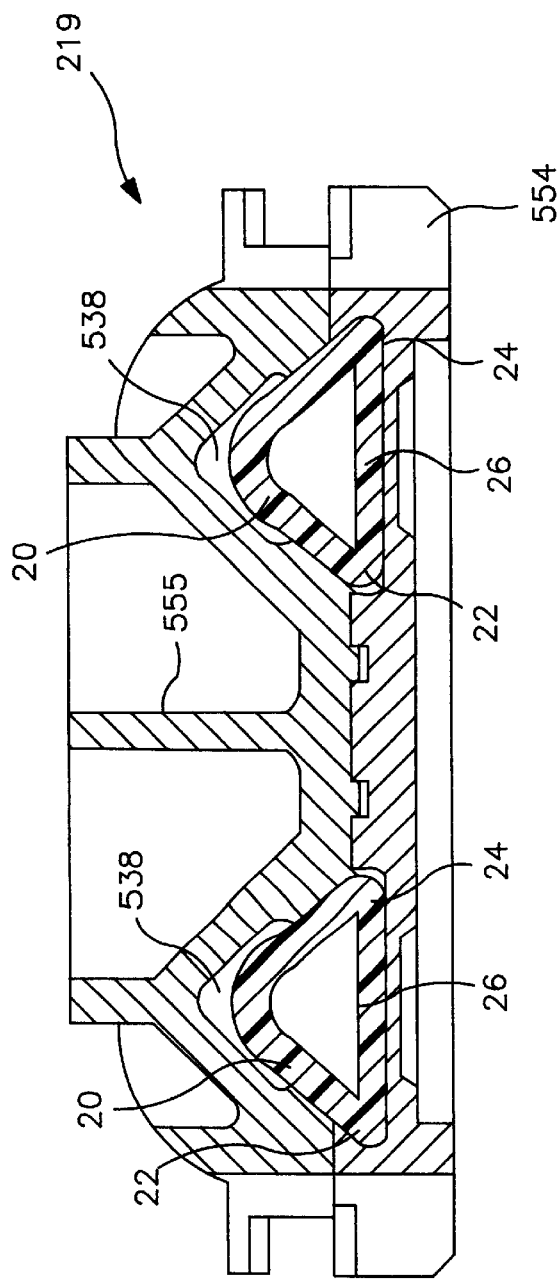
FIG. 3B is a cross-sectional view of a further embodiment of FIG. 2A taken along line 3A—3A.

In FIG. 3B, the constraint member 219 includes a first constraint component 554 and second constraint component 555. This embodiment is substantially the same as the embodiment shown in FIG. 3A, with the addition of two escape portions 538 defined in the second constraint component 555 in substantially the same manner and for the same purpose as described with reference to FIG. 1B. Even with the escape portions 538 defined in the second constraint component 555, constrained sections 22 and 24 of the tube remain substantially fixed on opposite sides of the substantially flat section 26 or of each tube 20. The escape portions 538 and voids are located adjacent regions of the tubes 20 outside of the substantially flat sections 26.

Apparatus 13 should be assembled such that multiple tubes 20 can be constrained in substantially the same way, or consistently and reproducibly constrained from one apparatus to the next, or both. An assembler tool 40, as that illustrated in FIGS. 4A–4B, may be used. In general, assembly of at least one tube 20, may follow the steps described in the flow diagram of FIG. 5 but other assembly methods resulting in a constrained tube or tubes may also be followed.

Figure 4A:
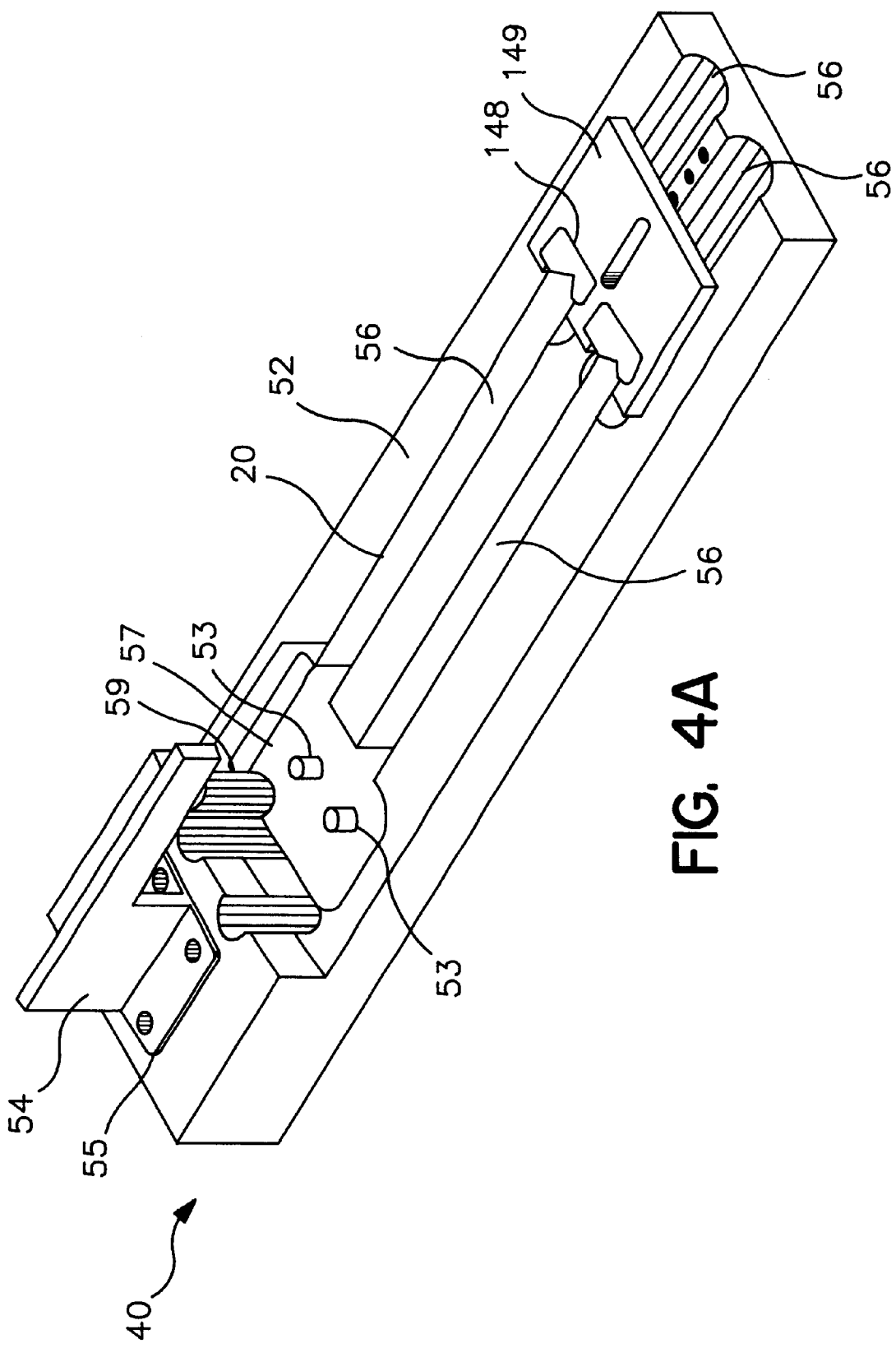
FIG. 4A is a perspective view of assembler tool.
Figure 4B:
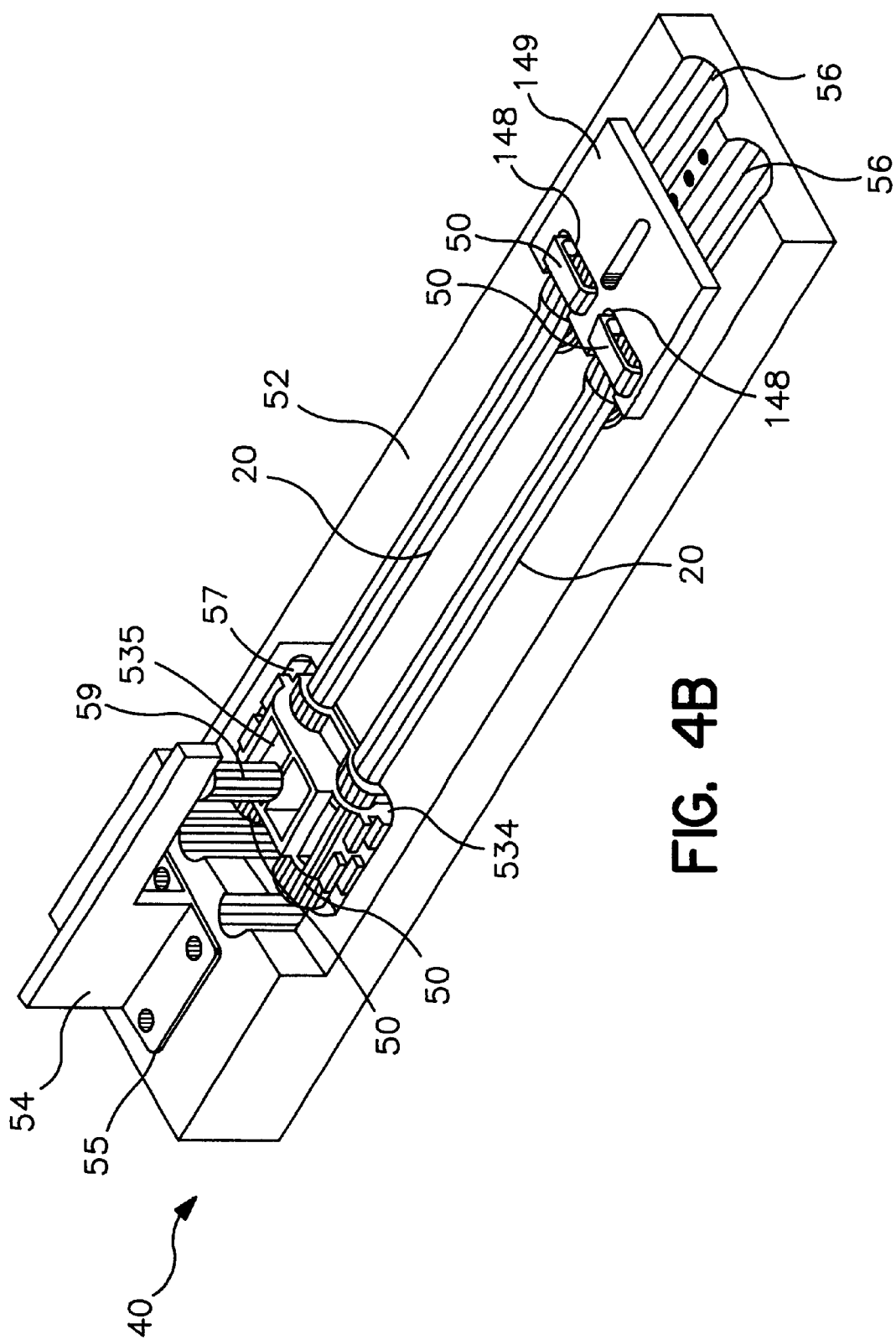
FIG. 4B is a perspective view of the combination of an assembler tool and a tube constraint apparatus.

As an example, dual tube constraint apparatus 13 as shown in FIGS. 2A–3A may be assembled using the assembler tool 40 of FIGS. 4A and 4B and the method shown in FIG. 5. The assembly method includes positioning the first constraint component 534 in a depression 57 defined in an assembler tool body 52 of the assembler tool 40. The depression 57 is sized to receive the first constraint component 534 securely i.e., (does not move from side to side). When placing the second constraint component 535 over the tube 20 and first constraint component 534, tubes 20 should not be pushed through the pressure reading openings 30. Thus, filler elements 53, formed in a depression 57 of the assembler tool 40, provide for filling of the pressure reading openings 30 during the positioning of the second constraint component 535 relative to the first constraint component 534. The assembler tool has filler elements 53 corresponding to each tube 20. Filler elements 53 extend through the pressure reading opening 30 of the first constraint component 534 when each filler element is about planar with an inner surface 532 of the first constraint component 534. Filler elements 53 prevent the substantially flat sections 26 from moving into the pressure sensing openings 30.

If necessary, an optional bonding material can be applied to the first constraint component 534, or the second constraint component 535 or both. The inner substantially surface 532 and the inner constraint surface 533 are preferred locations for the bonding material. Prior to positioning the tube 20 relative to the first constraint component 534, UV-curable silicone adhesive is preferred for ease of application, curing and bonding qualities. The cured bonding material, prevents movement of the tube 20 within the constraint member 19. The assembly may be completed prior to exposure of the assembly to UV radiation. It is preferred to avoid use of the bonding material, if possible, to avoid additional effort and cost.

After the first constraint component 534 is positioned in the depression 57, tubes 20 are located in channels 56. The channels 56 provide for precise positioning of the tubes 20 over and across the first constraint component 534. Each tube 20 is positioned in a stretched configuration across the first constraint component 534 by engaging each end of the tube 20 with an appropriate tool. For example, the mechanism as shown in FIGS. 4A–4B includes tube couplings 50, 150 each fitted in the ends of the tube 20, as shown in FIGS. 2A–2C. Each coupling 50, 150 fits into an engagement aperture 48, 148 integrally formed in the first constraint component 534, such as illustrated in FIG. 2B. When the tube couplings 50 are engaged with the apertures or channels 48 in the first constraint component, and when the first constraint component is positioned in the depression 57, the tube is secured at one end of the assembler tool. The other engagement apertures 148 are defined in laterally movable element 149 and sized for receiving tube couplings 150. Thus, when movable element 149 is fixed to body 52 and the couplings 150 in position, the tube is secured at the other end of the assembler tool 40. The positioning of the movable element 149 allows the tube to be stretched, across the constraint component 534.

To assemble each tube 20 within constraint member 19, tension resulting in about 5% to about 10% elongation of the tube 20 is preferred. This stretches each tube 20 across the first constraint component 534 so that a substantially linear tube section is positioned across the first constraint component 534.

Next, the second constraint component 535 is loosely positioned over the tubes 20 and the first constraint component 534. The second constraint component 535 is positioned such that inner surfaces 533 contact the tubes 20. As described previously, a bonding material is applied prior to positioning.

In another optional step, prior to actually constraining the tubes 20 between the first and second constraint components 534 and 535, tubes 20 are pressurized with any suitable fluid (gas of liquid), and then, if necessary, again as the second constraint component 535 is interlocked with the first constraint component 534. Alternatively, the second constraint component 535 can be placed over the tubes 20 before the tubes 20 are pressurized. To pressurize the tubes 20, one end of each tube 20 is plugged using any suitable method. A tube stop (not shown) could be inserted at either end of each tube. And fluid introduced in the other end. Pressures on the order of 800 mmHg are suitable.

Once the tube 20 is pressurized and the second constraint component 535 is positioned over the first constraint component 534, a positioning element 54 of the assembler tool 40 applies a force on the second constraint component 535. The positioning element 54 is rotatably mounted along its rear edge 55 on the assembler tool body 52, such that a pin 59 contacts the second constraint component 535 aligning the components 534 and 535 together. After assembly of the apparatus 13 is completed, it is removed from the assembler tool 40.

Using an assembler tool 40 as described above is only one way of constraining the tubes 20. For example, a tube could be inserted into a tube opening having a shape to form the substantially flat section.

Figure 6A:
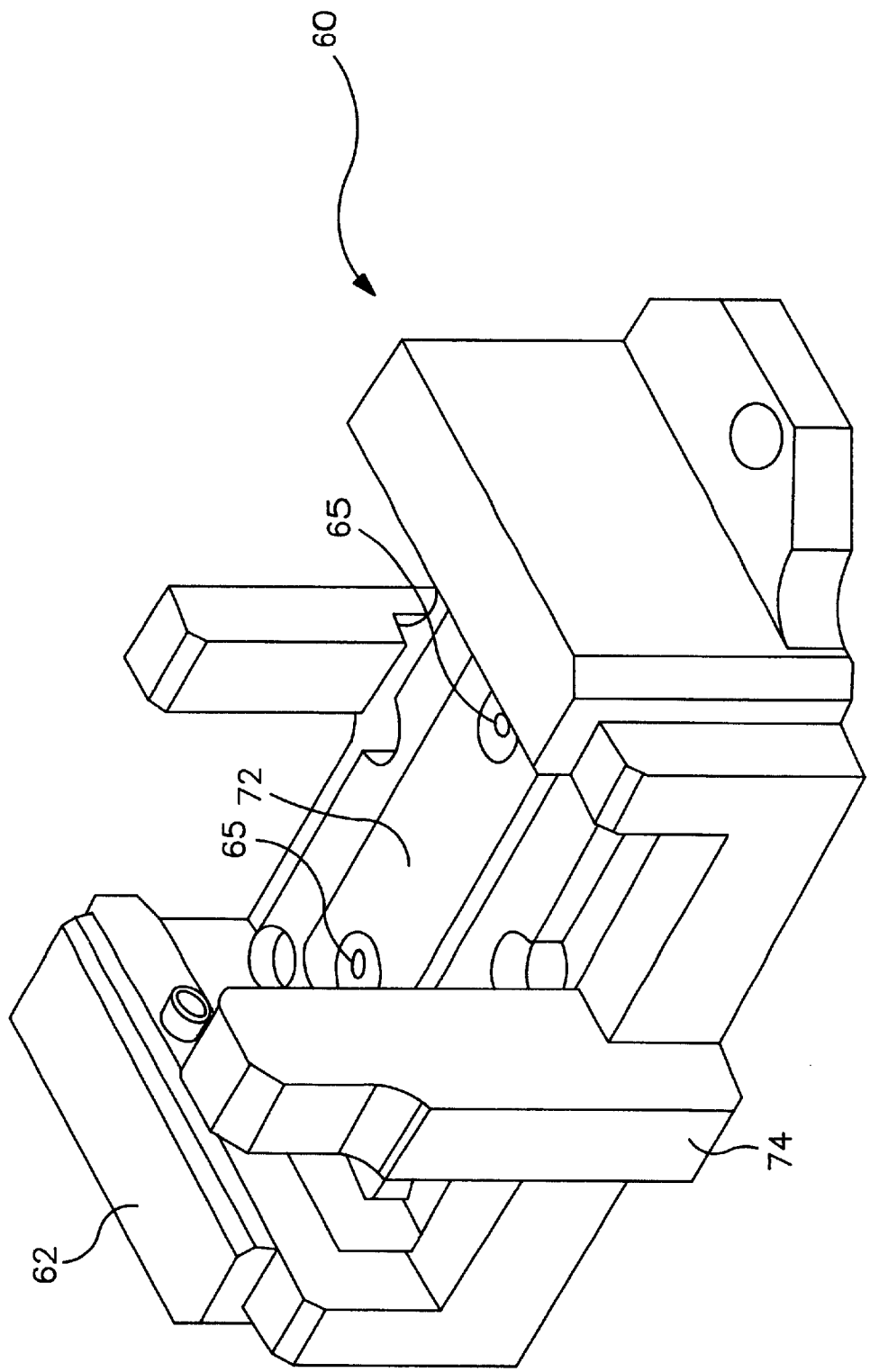
FIG. 6A is a perspective view of a pressure sensor housing.
Figure 6B:
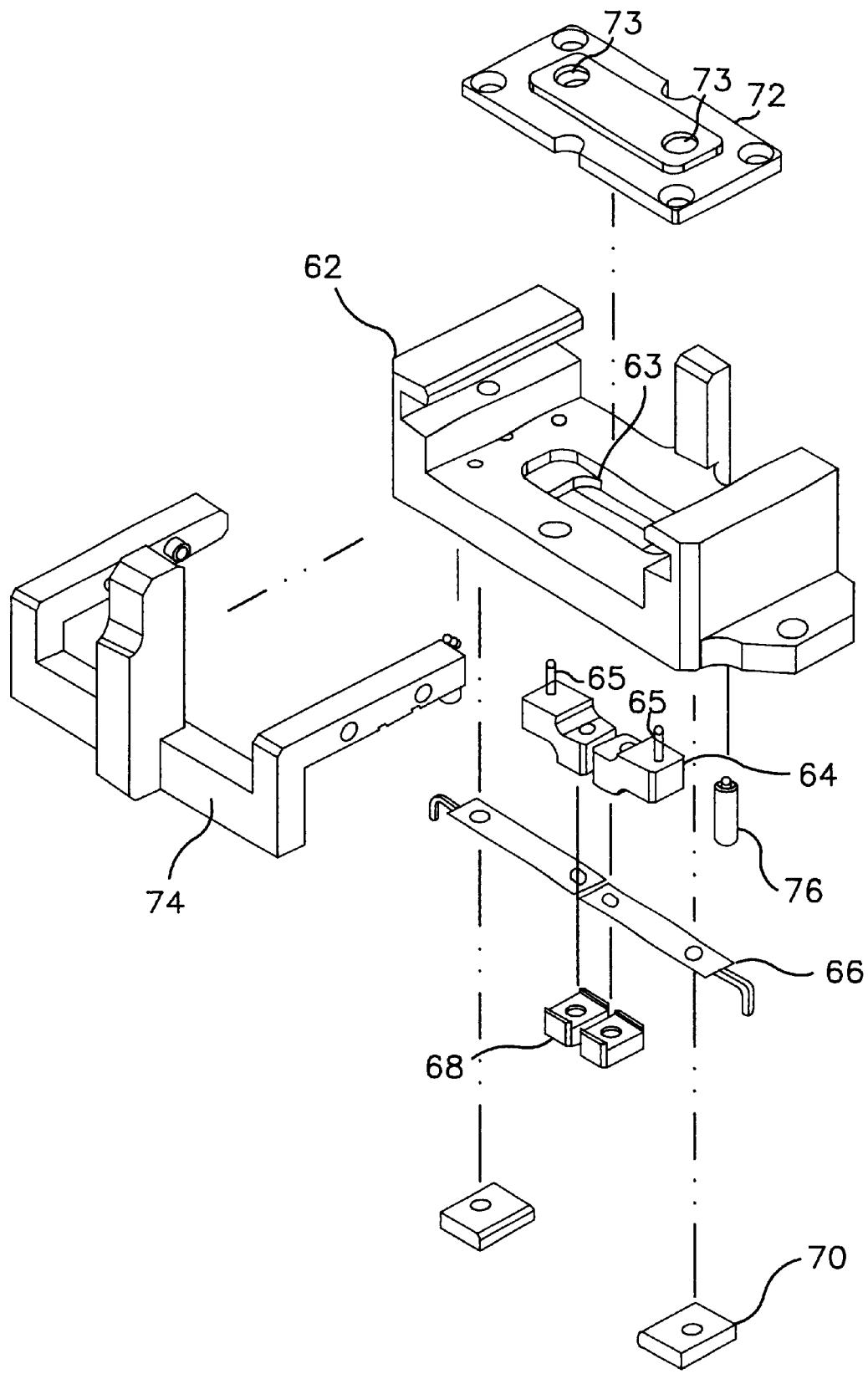
FIG. 6B is an exploded view of the pressure sensor housing of FIG. 6A.
Figure 7:
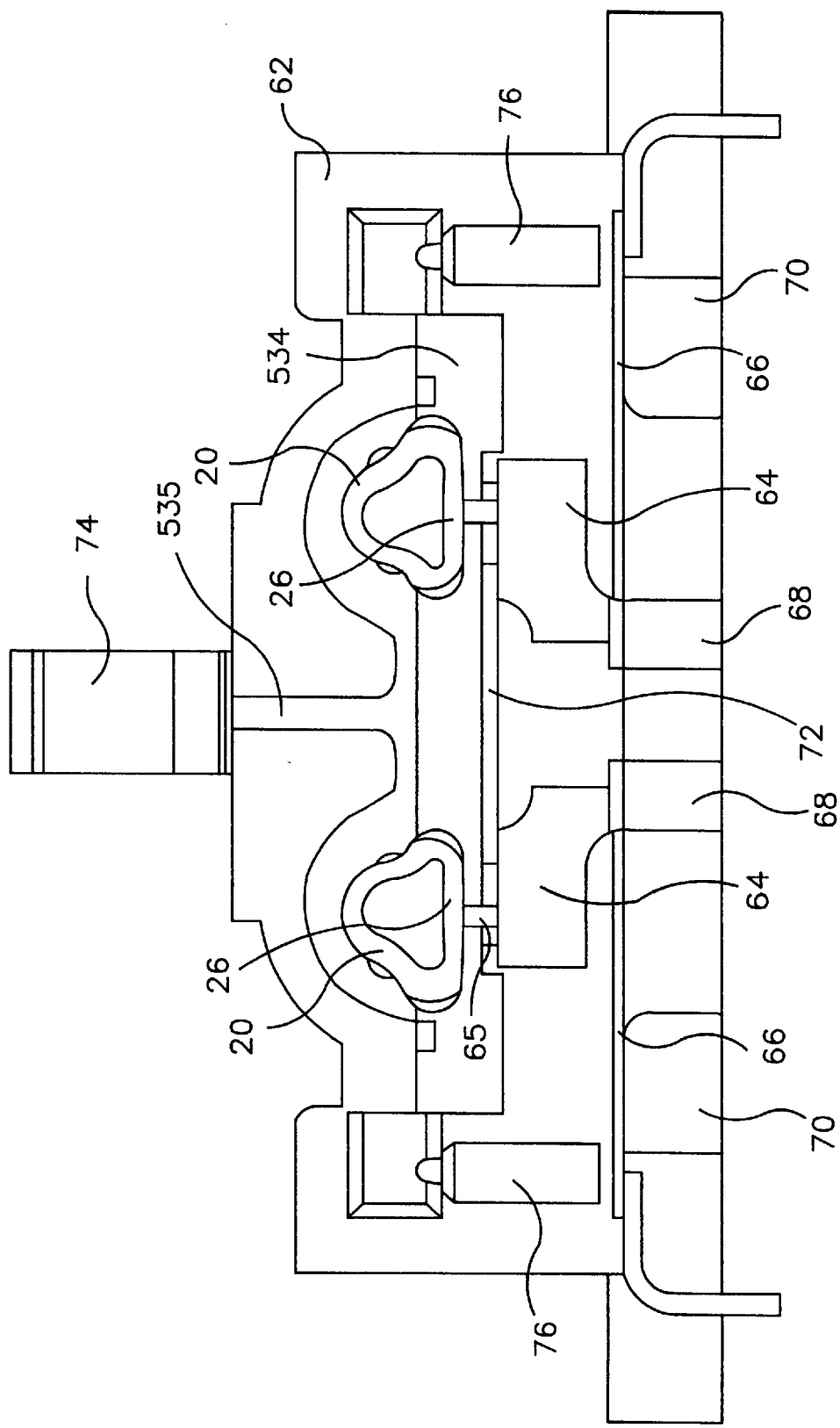
FIG. 7 is a cross-sectional view of the embodiment of FIG. 3B positioned in the pressure sensor housing of FIG. 6A.

Once the tubes 20 are constrained within the dual constraint member 19, as illustrated in FIGS. 2A–2C, the apparatus 13 is positioned within a pressure sensor housing, such as the pressure sensor housing 60 illustrated in FIGS. 6A–7. The pressure sensor housing 60 contains components for positioning a sensing mechanism relative to the substantially flat section 26 of the tube 20, as illustrated in the cross-sectional view of FIG. 7. In FIG. 7, the dual constraint apparatus 13 is positioned in the sensing housing 60 with pins 65 positioned adjacent the substantially flat section 26 of the tube 20.

The pressure sensor housing 60, as shown in the exploded view of FIG. 6B, includes a main pressure assembly block 62 having an opening 63 for receiving pressure sensing pins 65. S-shaped members 64 are coupled to the pins 65 for translating linear deflection of the tube 20 to strain beams 66 fixed to the S-shaped members 64 with movable clamps 68 and fixed clamps 70. A pressure seal plate 72 is coupled to the assembly block 62, opposite the strain beams 66. Openings 73 in the pressure seal plate 72 allow the pins 65 contact the tube 20 through the pressure sensing openings 30 in the constraint member 19. A pressure fitting latch 74 and pins 76 complete the pressure sensor housing 60 A conventional arrangement of spring loaded pins and detents is suitable. The dual constraint member 19 and tubes 20 are placed in the housing as illustrated in the cross-sectional view of FIG. 7. The pressure sensor housing and method of assembly should provide precise and repeatable positioning. Conventional techniques, such as the use of close tolerances and spring loaded assembly, are preferred.

Pressure measurements taken from the substantially flat sections 26 of tubes 20 have an error of +/−10 mmHg when taking pressure readings of about 0 to about 100 mmHg. Pressure measurements have an error of +/−10% when taking pressure readings of about 100 to about 500 mmHg. In general, the design requirements for the apparatus are those found in conventional cardioplegia delivery systems and components.

Figure 8:
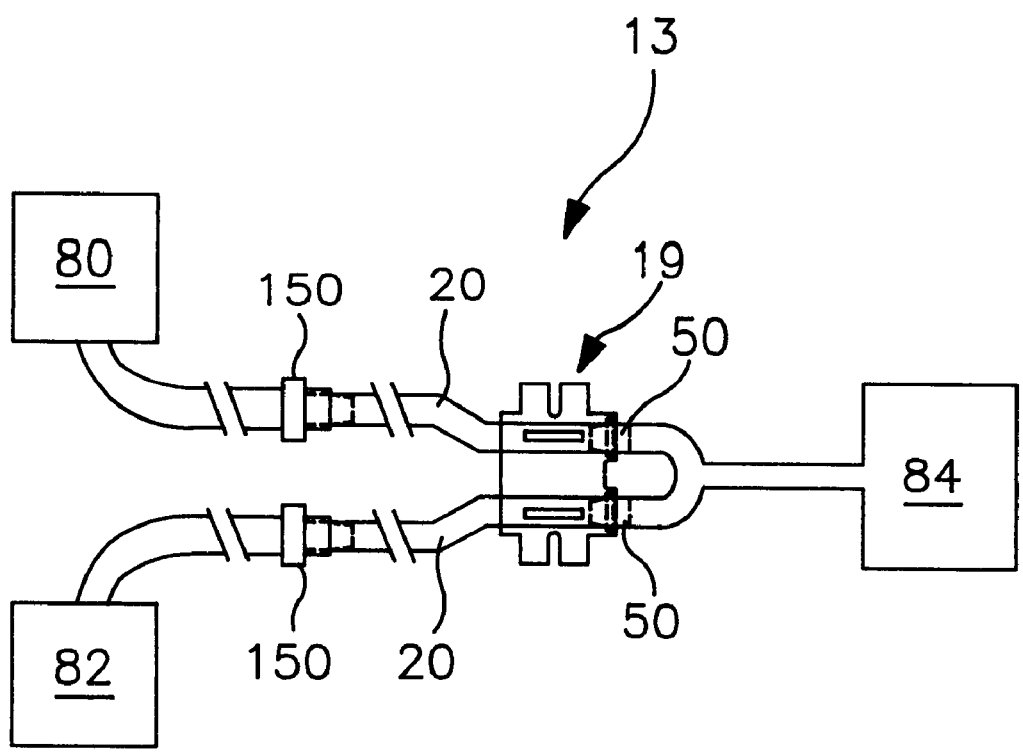
FIG. 8 is a schematic view of a cardioplegia safety system using a tube constraint apparatus, such as the tube constraint apparatus shown in FIGS. 2A–2C.

A preferred application of the invention is measurement of fluid pressure in a cardioplegia safety system (CSS). As illustrated in FIG. 8, two tubes 20 are constrained in a dual constraint member 19. Fluid pressure measurements are taken at the substantially flat sections of the tubes 20 The two tubes 20 are constrained in substantially the same shape, so as to be able to provide uniform, accurate readings of fluid pressure within both tubes 20. One tube 20 carries oxygenated blood pumped from an external blood oxygenator 80. The other tube 20 carries drugs, such as a candioplegia solution, pumped from an external drug supply 82. The dual constraint apparatus 13 is connected to the oxygenator 80 and drug supply 82 using the tube couplings 150. Roller pumps, linear pumps, rotary peristaltic pumps, or any other suitable pumps can be used.

When using a CSS, accurate fluid pressure within each tube 20 helps ensure that correct drug dosages are be delivered to a patient 84.

If more than two tubes 20 are used, the constraint member 19 is modified in accordance with the number of tubes 20 used, so as to obtain uniform, accurate readings of fluid pressure within each tube 20.

Another application of the method and apparatus of the invention is measurement of input blood pressure in a blood collection system. In this application, a single tube constraint member 18, such as that illustrated in FIG. 1A, is positioned around a tube 20. The tube 20 extends from a patient to a blood collector. Reliable pressure readings are taken using a pressure sensor mechanism through a pressure sensing opening 30 in the constraint member 18.

We claim:

1. A fluid pressure sensing apparatus, comprising (a) a deformable tube for carrying fluid; and (b) at least one constraint member comprising an inner surface and a pressure sensing opening, the inner surface comprising a substantially flat portion and a constraint portion; in which the tube is positioned against the inner surface and constrained by the constrained portion such that a portion of the tube is deformed against the sustantially flat portion of the inner surface to produce a substantially flat section of the tube adjacent to, and accessible through, the pressure sensing opening; wherein a first constrained section of the tube is adjacent a first side of the substantially flat section, and a second constrained section of the tube is adjacent a second side of the substantially flat section, further wherein the at least one constraint member includes a first constraint component comprising the substantially flat portion of the inner surface and the pressure sensing opening, and a second constraint component engaged with the first constraint component to deform of the tube and substantially fix the first and second constrained sections and wherein the first constraint component comprises a channel having a bottom wall and two side walls, and the second constraint component is engaged with the first constraint component to substantially fix the first and second constrained sections against at least one wall.

2. A fluid pressure sensing apparatus, comprising (a) a deformable tube for carrying fluid; and (b) at least one constraint member comprising an inner surface and a pressure sensing opening, the inner surface comprising a substantially flat portion and a constraint portion; in which the tube is positioned against the inner surface and constrained by the constraint portion such that a portion of the tube is deformed against the substantially flat portion of the inner surface to produce a substantially flat section of the tube adjacent to, and accessible through, the pressure sensing opening, the apparatus further comprising the constraint member comprises at least two bends, each not more than about 90 degrees, a first bend positioned along one side of the substantially flat portion of the inner surface and a second bend positioned along an opposing side of the substantially flat portion of the inner surface.

3. The apparatus of claim 2, in which the constraint member comprises three bends, the substantially flat portion of the inner surface lies between two of the bends, and the substantially flat section of the tube is adjacent the substantially flat portion of the inner surface.

4. The apparatus of claim 3, in which the tube is deformed into a substantially triangular shape, and the constraint member further comprises a void at a third bend opposite from the substantially flat portion of the inner surface between the tube and the constraint member.

5. The apparatus of claim 2, in which the constraint member comprises at least one void not adjacent the substantially flat section of the tube.

6. The apparatus of claim 5, in which at least one void is symmetrically located with respect to the substantially flat section of the tube.

* * * * *

UNITED STATES PATENT AND TRADEMARK OFFICE
CERTIFICATE OF CORRECTION

PATENT NO. : 6,250,164 B1
DATED : June 26, 2001
INVENTOR(S) : O'Brien et al.

It is certified that error appears in the above-identified patent and that said Letters Patent is hereby corrected as shown below:

<u>Column 10, claim 1,</u>
Line 11, "constrained" should read -- constraint --.

Signed and Sealed this

Fifteenth Day of January, 2002

Attest:

JAMES E. ROGAN
*Director of the United States Patent and Trademark Office*

*Attesting Officer*